Sept. 22, 1953      E. W. PIKE      2,652,978

MULTIPLICATION AND DIVISION LINKAGE OPERATOR

Filed March 14, 1951      2 Sheets-Sheet 1

INVENTOR
EUGENE W. PIKE
BY *Elmer J. Gom*
ATTORNEY

Sept. 22, 1953     E. W. PIKE     2,652,978
MULTIPLICATION AND DIVISION LINKAGE OPERATOR
Filed March 14, 1951     2 Sheets-Sheet 2

INVENTOR
EUGENE W. PIKE
BY
ATTORNEY

Patented Sept. 22, 1953

2,652,978

UNITED STATES PATENT OFFICE 2,652,978

MULTIPLICATION AND DIVISION LINKAGE OPERATOR

Eugene W. Pike, Newton, Mass., assignor to Raytheon Manufacturing Company, Newton, Mass., a corporation of Delaware Application March 14, 1951, Serial No. 215,515

2 Claims. (Cl. 235—61)

This invention relates to improvements in multiplication and division linkage operators and more particularly to those of the type disclosed in the copending application, Serial No. 190,456, filed October 18, 1950, by Sumner D. Lewis.

In linkage operators of this type one factor of the multiplication is entered by a linear displacement of the first input element which is communicated to a second input element by a link. The angular displacement of the second input element represents the other factor of the multiplication. The total resultant linear displacement of a slide member mounted in a slot on the second input member represents the product. This displacement is transmitted to a slide mounted in a slot on a fixed frame member by a pivotally mounted link connecting the two slide members. The displacement may be more accurately transmitted to an output slide by a second pivoted link connected to the center point of the first output link and half its length, and joined at its other end to a slide in the output slot as described more fully in the copending application of Philip T. Nickson, Serial No. 212,912, filed February 27, 1951.

In both these cited applications the center line of the input slot is shown at right angles to that of the output slot. This construction permits minimum error when the range of at least one of the factors varies approximately symmetrically about the zero reference line. When the range of both factors represents values predominantly positive or negative, the errors are no longer at a minimum. It has been found that the errors may again be reduced to a minimum if the center line of the fixed input slot is positioned at the center of the anticipated swing of the angular displacement input member.

This modification in design leaves a small residual error that may be reduced further by adding a two-bar linkage to the output. Such a two-bar linkage comprises an additional slide mounted in a slot whose center line is positioned at an angle to the center line of the original output slot. This additional slide is pivotally connected by a link to the original output slide. The relative angle of the output slides are chosen, together with the length of the link, to introduce a slight nonlinearity into the output to compensate for the remaining error of the improved linkage operator.

As before, this improved machine may be used for division by inserting the dividend as a displacement of the original output slide and inserting the divisor by displacing either the original input slide or the rotating input member with the resulting displacement of the unused member reprsenting the output.

These, and other advantages, features and objects of the invention will become more apparent from the following description taken in connection with the illustrative embodiments in the accompanying drawings, wherein.

Figure 1:
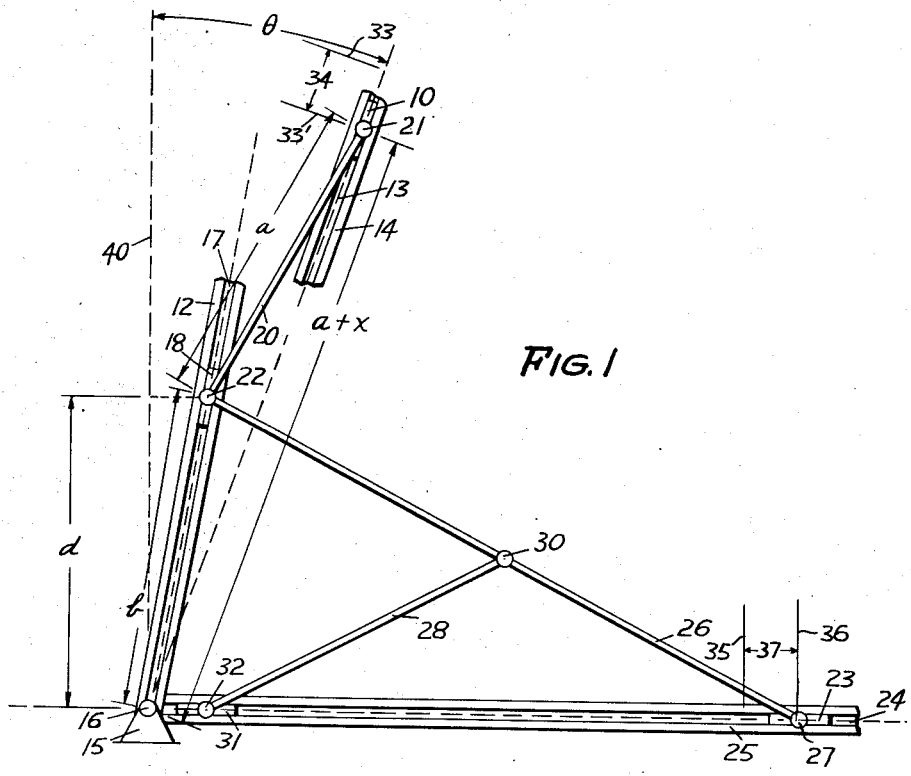
Fig. 1 is an illustrative schematic diagram of one embodiment of the invention.

In Fig. 1 the various members are shown with a particular set of dimensions. However, it should be understood that such a linkage arrangement will act as an approximate multiplier or divider for a wide selection of linkage dimensions. Therefore, the dimensions used are intended to be illustrative only, and not restrictive. The illustrative embodiment in Fig. 1, when used as a multiplier, has a first input member 10 and a second input member 12. The first input member 10 is mounted to slide within a slot 13 in a frame member 14. The second input member 12 is pivoted to the frame 15 at point 16 and is formed with a slot 17 within which a slide 18 is mounted. A link 20 is pivotally fastened to slides 10 and 18 at points 21 and 22, respectively. The linear displacement of point 22 is communicated to a slide 23 fitted in a slot 24 in a frame member 25 by a link 26 pivotally attached to a slide 18 at a point 22 and to the slide 23 by pin 27. At the center of link 26 a third link 28 is pivotally attached by pin 30. This link 28 is attached at its other end to a slide 31 in the slot 24 in frame member 25 by a pin 32.

The dimensions are selected for the various parts by the design procedure described in the cited copending Lewis application. It is not thought necessary to repeat a description of this design procedure at this point.

As more fully described in the copending Lewis application referred to above, one factor of a multiplication is represented by the linear displacement of slide 10 from the position represented by line 33 to that represented by line 33', a distance represented by the dimension 34. The second factor is represented by the angular displacement $\theta$ of the pivoted input 12. The result is to displace the slide 18 both angularly and linearly along the slot 17. This displacement is communicated to the slide 23 by the link 26 and moves the pin 27 from the position represented by the line 35 to that represented by the line 36, a distance represented by the dimension 37.

If the center line of the slot 13 is positioned along a line passing through the pivot 16 of the rotatable input member 12, but not at right angles to the center line of the output slot 24, certain errors will be introduced by the angle the center line of the slot 13 makes with the center line of the slot 17 in the input member 12. This will be more clearly understood from a consideration of Fig. 2 which is a diagrammatic representation of the geometry of the part of the system including the input member 12, the input slide 10 and its slot 13, and the link 20. The pivot point 16, the center of the pin 21 on the slide 10, and the center of the pin 22 on the slide 18 form the apexes of a triangle. A line 40 is erected at point 16 perpendicular to the center line of the output slide 24. The angle between the perpendicular 40 and the center line of the slot 13 is hereinafter designated as $\theta$. The length of the link 20 between points 21 and 22 is hereinafter designated as $a$. The distance of the point 22 from the pivot 16 is hereinafter designated as $b$. The projection of this line 17 of length $b$ on the slot 24 is $y$, as shown by the perpendicular 41 dropped from the point 22 to the center line of the output slot 24. The angular displacement of the piovtal input member 17 from the reference line 40 is represented by $\phi$. The angle between the center line of the slot 17 and the center line of the input slot 13 is represented by $A$. The distance from the pivot point 16 to the slide 21 along the slot 13 is represented by $a+x$, the length of the link 20 plus the displacement of the slide 21 along the slot 13. The angle between the link 20 and the center line of the input slot 13 is represented by $B$. The supplement of the angle between the center line of the slot 17 and the link 20 is represented by $C$. The angular displacement of the pivoted input member 12 from the reference line is represented by $\phi$. The projection of the dimension $b$ on the reference line 40 is represented by $d$. The output $y$ can be written in two ways, as:

$$y = b \sin \phi = x \sin \phi \left[ 1 + E(a, x, \phi) \right] \quad (1)$$

and as $$y = d \tan \phi = x \tan \phi \cos \theta (1+n) \quad (2)$$

where the error terms $E$ and $n$ are at least one order smaller than unity. The expansion of each of these expressions will be shown below to have a useful place in multiplier design.

Now by the well-known cosine law of trigonometry:

$$\cos A = \frac{b^2 + (a+x)^2 - a^2}{2b(a+x)} \quad (3)$$

transposing and solving the above equation for $b$:

$$b = \cos A (a+x) + \sqrt{a^2 - (a+x)^2 + \cos^2 A (a+x)^2} \quad (4)$$

converting $\cos A$'s to $\sin A$'s in (4) and simplifying $$b = (a+x)\sqrt{1-\sin^2 A} + a\sqrt{1 - \left(\frac{a+x}{a}\right)^2 \sin^2 A} \quad (5)$$

It will be recognized that the expression $$\sqrt{1-\sin^2 A}$$

can be expanded to the series $$1 - \left(\frac{\sin^2 A}{2}\right) - \left(\frac{\sin^4 A}{8}\right)$$

by analogy to the expression $\sqrt{1-x}$ if $\sin^2 A$ is represented by $x$ as shown on page 114 of the Handbook of Mathematics for Engineers by Huntington.

Similarly, the expression $$\sqrt{1 - \left(\frac{a+x}{a}\right)^2 \sin^2 A}$$

also can be recognized as expandable to the series:

$$1 - 2\left(\frac{a+x}{2a}\right)^2 \sin^2 A - 2\left(\frac{a+x}{2a}\right)^4 \sin^4 A \cdots$$

if $$\left(\frac{a+x}{a}\right) \sin^2 A$$

is substituted for the $x$ of the standard form.

Substituting the appropriate series in Equation 5

$$b = (a+x)\left(1 - \frac{\sin^2 A}{2} - \frac{\sin^2 A}{8} \cdots\right) - a\left(1 - 2\left[\frac{a+x}{2a}\right]^2 \sin^2 A - 2\left[\frac{a-x}{2a}\right]^4 \sin^4 A \cdots\right) \quad (6)$$

which can be simplified to $$b = (x + \tfrac{1}{2})\left[a\left(\frac{a+x}{a}\right)^2 - a - x\right]\sin^2 A - \tfrac{1}{8}\left[a\left(\frac{a+x}{a}\right)^4 - a - x\right]\sin^4 A \cdots) \quad (7)$$

which can be further simplified to $$b = x\left[1 + \tfrac{1}{2}\left(1 + \frac{x}{a}\right)\sin^2 A + \tfrac{1}{8}\left(1 + \frac{a}{x}\right)\left(1 + \frac{x}{a}\right)^3 - 1\right] \quad (8)$$

substituting (8) in (1):

$$y = x \sin \phi \left[1 + \tfrac{1}{2}\left(1 + \frac{x}{a}\right)\sin^2 A + \tfrac{1}{8}\left(1 + \frac{a}{x}\right)\left\{\left(1 + \frac{x}{a}\right)^3 - 1\right\}\sin^4 A + \cdots\right] \quad (9)$$

Thus the terms between the square brackets of Equation 9 define the terms within the brackets in Equation 1 and permit the error of a given multiplier to be calculated to any degree of accuracy required, or conversely the link length $a$ may be adjusted so that, over the desired range of inputs $x$ and $\phi$, the error will not exceed the maximum permissible error for the particular application. It will also be noted that, with the dimensions computed according to this formula, $\phi$ will not be a factor and so this formula is used in designing the computer with the slot input slide.

Figure 2:
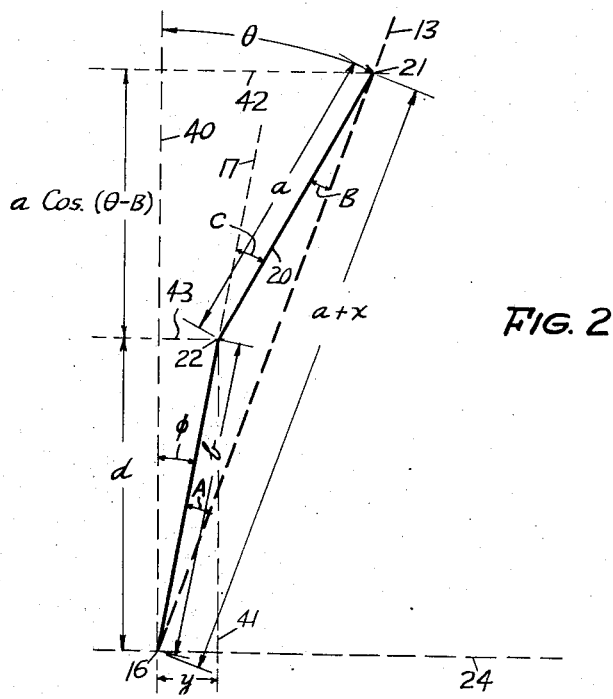
Fig. 2 is a diagrammatic illustration of the principle of the invention.

It will be seen from Fig. 2 and trigonometric principles that, if a perpendicular 42 is drawn from point 21 to line 40 and another perpendicular line 43 is drawn from the point 22 to line 40, the distance $d$ will be the difference between the projection of the distance between points 16 and 21 along the slide 13 onto line 40 and the projection of the length of the link 20 on line 40. The projection of $a+x$ on the line 40 is equal to $\cos \phi \, (a+x)$. The projection of link 20 on line 40 is the distance $a$ times the sine of the angle between link 20 and the line 42. This angle is equal to the angle between slot 13 and the line 42 less the angle B. By geometric principles concerning right triangles, this larger angle is the complement of the angle $\theta$.

Thus:

$$d = (a+x)\cos \theta - a \sin(90 - \theta - B) \quad (10)$$

This reduces to:
$$d = (a+x)\cos\theta - a\cos(\theta - B) \quad (11)$$
$$= (a+x)\cos\theta - a(\cos\theta\cos B + \sin\theta\sin B) \quad (12)$$

The three angles of the triangle are
$$A, B, \text{ and } 180° - C$$
$$A + B + 180 - C = 180°$$
so that
$$B = C - A \quad (13)$$

By the law of sines
$$\sin C = \frac{a+x}{a}\sin A \quad (14)$$

$$\cos B = \cos(C - A) \quad (15)$$
$$= \cos C \cos A + \sin C \sin A \quad (16)$$

substituting (14) in (16) and converting cosines to sines:
$$\cos B =$$
$$\sqrt{1 - \left(\frac{a+x}{a}\right)^2 \sin^2 A}\sqrt{1 - \sin^2 A} + \left(\frac{a+x}{a}\right)\sin^2 A \quad (17)$$

It can be shown that
$$\cos B = \frac{a+x}{a}\sin^2 A + \left(1 - \frac{a+x}{a}\sin^2 A\right)$$
$$\left[1 - \frac{x^2}{a^2}\left(1 - \frac{a+x}{a}\sin^2 A\right)^2 \sin^2 A\right]^{1/2} \quad (18)$$

This can be expanded to the series
$$\cos B = 1 - \tfrac{1}{2}\left[\frac{x^2}{a^2}\left(1 - \frac{a+x}{a}\sin^2 A\right)\right]\sin^2 A$$
$$- \tfrac{1}{8}\left[\frac{x^4}{a^4}\left(1 - \frac{a+x}{a}\sin^2 A\right)^3\right]\sin^4 A \cdots \quad (19)$$

Similarly
$$\sin B = \sin(C - A) \quad (20)$$
$$= \sin C \cos A - \cos C \sin A \quad (21)$$
$$= \frac{a+x}{a}\sin^2 A - \sin A\sqrt{1 - \left(\frac{a+x}{a}\right)^2 \sin^2 A} \quad (22)$$
$$= \sin A\left[\frac{x}{a} + \tfrac{1}{2}\left\{\left(\frac{a+x}{a}\right)^2 - \frac{a+x}{a}\right\}\sin^2 A + \right.$$
$$\left. \tfrac{1}{8}\left(\left\{\frac{a+x}{a}\right\}^4 - \frac{a+x}{a}\right)\sin^4 A + \cdots\right] \quad (23)$$

(12) can now be rewritten substituting (19) and (23) to give
$$d = X\cos\theta + 2a\cos\theta\left[\left(\frac{x}{2a}\right)^2\left(1 + \left\{\frac{a+x}{a}\right\}\sin^2 A + \cdots\right)\sin^2 A + \right.$$
$$\left(\frac{x}{2a}\right)^4\left(1 + 3\left\{\frac{a+x}{a}\right\}\sin^2 A + \cdots\right)\sin^4 A + \cdots\right] -$$
$$x\sin\theta\sin A\left[1 + \tfrac{1}{2}\frac{a}{x}\left(\left\{\frac{a+x}{a}\right\}^2 - \frac{a+x}{a}\right)\sin^2 A + \right.$$
$$\left. \tfrac{1}{8}\frac{a}{x}\left(\left\{\frac{a+x}{a}\right\}^4 - \frac{a+x}{a}\right)\sin^4 A + \cdots\right] \quad (24)$$

substituting (24) in (2)
$$y = x\tan\phi\left[\cos\theta\left\{1 + \frac{x}{2a}\sin^2 A + \frac{x}{8a^3}(2a+x)^2\right.\right.$$
$$\left.\sin^4 A + \cdots\right\} - \sin\theta\sin A\left\{1 + \tfrac{1}{2}\left(1 + \frac{x}{a}\right)\sin^2 A + \right.$$
$$\left.\left.\tfrac{1}{8}\left(1 + \frac{a}{x}\right)\left\{\left(\frac{a+x}{a}\right)^3 - 1\right\}\sin^4 A + \cdots\right\}\right]$$

It will be seen that this last equation contains functions of $\theta$ and terms in the first order of A, whereas the sine expansion (9) contains only terms in the even powers of sin A. Thus when $\theta \neq$ zero, the sine form is evidently better as it contains only even powers of sin A. On the other hand, if $\theta \to$ zero, then in the tangent expansion the terms in the odd orders of sin A vanish and the coefficients of the even orders of sin A are considerably smaller, thus making the tangent expansion of the design formula best when the center lines of the input and output slide slots are at right angles.

This analysis shows that the form of the Lewis-Nickson multiplier having the input and output slots at right angles should be used where at least one of the inputs has a range symmetrical about zero. The "symmetrical" input should be put on the rotating slide and the "unsymmetrical" input on the vertical slide and the tangent expansion of the design equation used.

On the other hand, if both inputs have "unsymmetrical" ranges about zero, then the computer should be designed with the fixed input slot at an angle $\theta$ to the output slot and the sine expansion of the design formula should be used with $\theta$ equal to the mean value of $\phi$ representing the input on the rotating slide. Where $\theta$ so chosen is very small, there will be a point at which the larger coefficient of sine² A will overbalance the term sin $\theta$ sin A, and, where one range of input values is very slightly asymmetrical, the tangent expansion will be superior. The point where the tangent expansion of the design formula becomes preferable to the sine expansion will be close to the point where $$\theta = \frac{A}{2}$$

where A is half the range of $\phi$.

Figure 3:
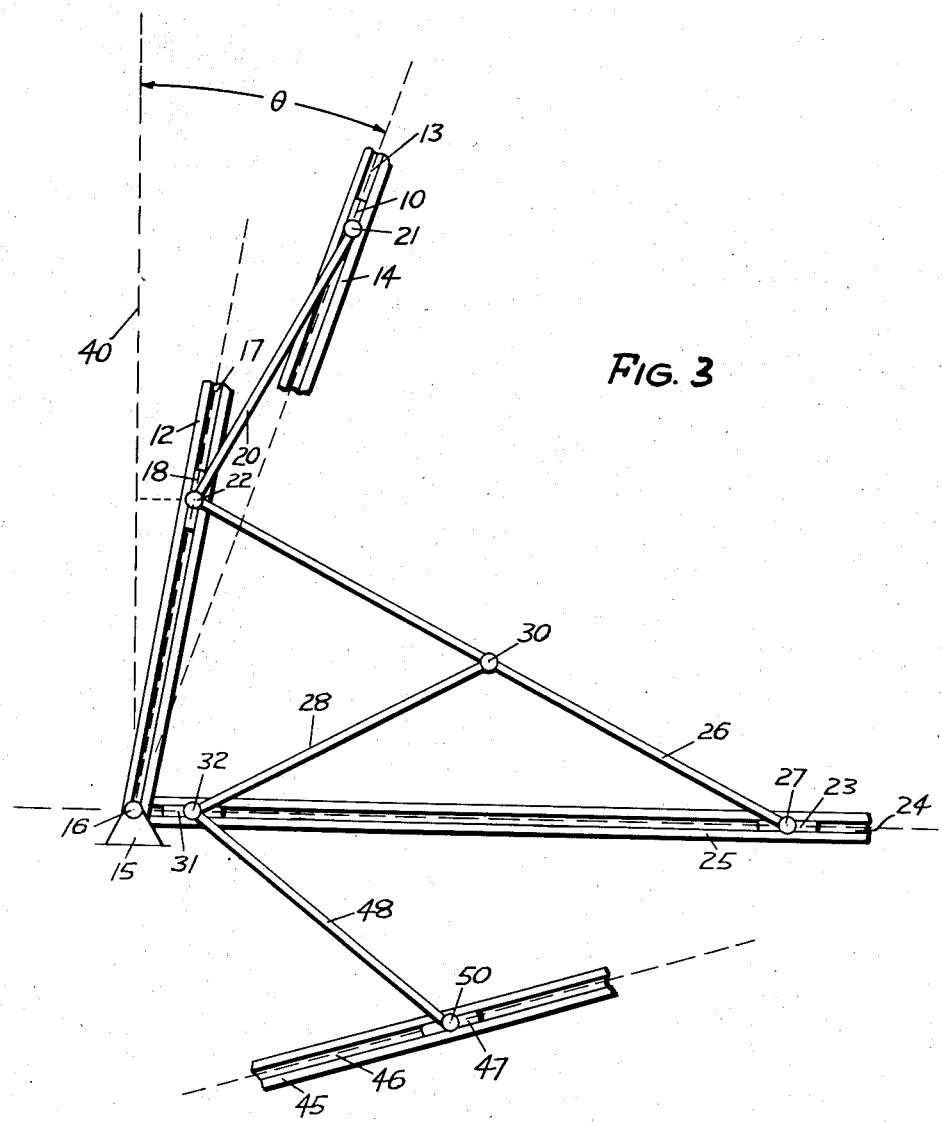
Fig. 3 is a diagrammatic illustration of a modification of the invention utilizing a two-bar correction linkage added to the output.

Fig. 3 shows a structure for removing the residual error of the device shown in Fig. 1. A frame member 45 is added at an angle to the slot 24 and formed with a slot 46 carrying a slide 47. A link 48 connects the pin 32 on the slide 31 to a pin 50 on the slide 47. The slide 47 moves a distance that is a function of the residual error of the multiplier computed by the sine expansion of the design formula and is so adjusted as to add a correction factor to exactly correct for this error in the output. The details of the design of a one-bar linkage of this type may be found in a text such as Antonin Svoboda's "Computing Mechanisms and Linkages," vol. 27 of the radiation series. Other means, such as a correction cam, or cam slot, could also be used to introduce this correction into the output.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A linkage operator comprising a first slidably mounted input member having a straight line path, a second pivotally mounted rotative input member with its pivot on the path of the first member, slide means on said second member causing movement along a straight line through said pivotal mounting, a connecting link engaging said first member and slide means; slidably mounted output means disposed to move along a path at an angle to the path of the first input slide member differing from ninety degrees by twice the desired range of rotation of the rotating slide-carrying input member and a connecting link engaging said slide means and output means.

2. A linkage operator comprising a first slidably mounted input member, a second pivotally mounted rotative input member, slide means on said second member causing movement along a line through said pivotal mounting, a connecting link engaging said first member and slide means; slidably mounted output means free to move along a path at an angle to the path of the first input member differing from ninety degrees by twice the range of rotation of the rotative input member, a connecting link engaging said slide means and output means; a slot positioned at an angle to the path of the first output means, a second output member free to travel in said slot and a link joining the first and second output members.

EUGENE W. PIKE.

References Cited in the file of this patent

UNITED STATES PATENTS

| Number | Name | Date |
|---|---|---|
| 2,498,312 | Svoboda | Feb. 21, 1950 |
| 2,543,872 | Schaefer, Jr. | Mar. 6, 1951 |

FOREIGN PATENTS

| Number | Country | Date |
|---|---|---|
| 408,803 | Great Britain | Apr. 19, 1934 |